(12) United States Patent
Kroner

(10) Patent No.: US 10,007,257 B2
(45) Date of Patent: Jun. 26, 2018

(54) INPUT/OUTPUT SYSTEM FOR AN INDUSTRIAL AUTOMATION SYSTEM AND METHOD FOR PROVIDING AN IMAGE OF AN INPUT/OUTPUT SYSTEM

(71) Applicant: Weidmueller Interface GmbH & Co. KG, Detmold (DE)

(72) Inventor: Michael Kroner, Oerlinghausen (DE)

(73) Assignee: Weidmueller Interface GmbH & Co. KG (DE)

( * ) Notice: Subject to any disclaimer, the term of this patent is extended or adjusted under 35 U.S.C. 154(b) by 180 days.

(21) Appl. No.: 15/022,629

(22) PCT Filed: Sep. 30, 2014

(86) PCT No.: PCT/EP2014/070977
§ 371 (c)(1),
(2) Date: Mar. 17, 2016

(87) PCT Pub. No.: WO2015/049251
PCT Pub. Date: Apr. 9, 2015

(65) Prior Publication Data
US 2016/0231735 A1    Aug. 11, 2016

(30) Foreign Application Priority Data

Oct. 1, 2013 (DE) .................. 10 2013 110 895

(51) Int. Cl.
*G05B 11/01* (2006.01)
*G05B 19/418* (2006.01)
*G05B 19/042* (2006.01)

(52) U.S. Cl.
CPC ..... *G05B 19/4185* (2013.01); *G05B 19/0423* (2013.01); *G05B 2219/31138* (2013.01)

(58) Field of Classification Search
CPC ............ G05B 19/4185; G05B 19/0423
See application file for complete search history.

(56) References Cited

U.S. PATENT DOCUMENTS

| | | | |
|---|---|---|---|
| 2007/0093921 A1 | 4/2007 | Braun et al. | |
| 2013/0249775 A1 | 9/2013 | Schaetzle et al. | |
| 2014/0121785 A1* | 5/2014 | Ismail | H04L 12/40032 700/3 |

FOREIGN PATENT DOCUMENTS

| | | |
|---|---|---|
| DE | 10 2004 051 179 A1 | 6/2005 |
| DE | 10 2011 084 321 A1 | 4/2013 |
| EP | 2 317 409 B1 | 5/2011 |

(Continued)

*Primary Examiner* — Vincent Tran
(74) *Attorney, Agent, or Firm* — Laubscher, Spendlove & Laubscher, P.C.

(57) ABSTRACT

A method and apparatus for producing an image of an input/output arrangement for an industrial automation system, comprising storing in a field bus coupler at least one image data file containing image data, transmitting the image data from the image data file to a service computer connected with the field bus coupler, and generating and displaying in the service computer an image that is a function of the image data transmitted from the field bus coupler. Additional image data may be stored in a module for transmittal to the service computer via a sub-bus and the field bus coupler, thereby to generate and display in the service computer a resultant image that is a function of both the image data and the additional image data.

9 Claims, 1 Drawing Sheet

(56) References Cited

FOREIGN PATENT DOCUMENTS

| JP | 2001053763 A | 2/2001 |
|---|---|---|
| WO | 03/036400 A1 | 5/2003 |

\* cited by examiner

INPUT/OUTPUT SYSTEM FOR AN INDUSTRIAL AUTOMATION SYSTEM AND METHOD FOR PROVIDING AN IMAGE OF AN INPUT/OUTPUT SYSTEM

REFERENCE TO RELATED APPLICATIONS

This application is a national stage application under 35 C.F.R. § 371 of International Application No. PCT/EP2014/070977 filed Sep. 30, 2014, which claims priority of the German application No. DE10 2013 110 895.4 filed Oct. 1, 2013.

BACKGROUND OF THE INVENTION

Field of the Invention

A method and apparatus for producing an image of an input/output system for an industrial automation system, comprising storing in a field bus coupler at least one image data file containing image data, transmitting the image data from the image data file to a service computer connected with the field bus coupler, and generating and displaying in the service computer an image that is a function of the image data transmitted from the field bus coupler.

Description of Related Art

In industrial automation systems, field buses for transmitting control data and/or measured values between one or more central control computers, also referred to as master computers or programmable memory controller (PMC), and field apparatus are exchanged. Field apparatus of a commonly needed and frequently used type consist of input/output modules that provide analog and/or digital input and/or output channels by means of which the installation components can be controlled and measured values can be read, for example, by sensors. Due to the large number of such input/output modules used in most industrial automation systems, such modules are often not connected directly to the field bus, but via the field bus coupler mentioned at the start, which represents a data interface between the field bus, on the one hand, and an often proprietary sub-bus, on the other hand. A plurality of bus-compatible modules, for example, the mentioned input/output modules, can be coupled to the sub-bus. The combination of a field bus coupler with optionally several modules is referred to as an input/output system or also a remote I/O (input/output) system.

The field bus coupler also referred to as field bus gateway is as a rule also used for the configuration of the connected modules. For this purpose, the field bus coupler is connected to an external (service) computer by means of which configuration, setup, startup and/or maintenance of the field bus coupler as well as of the connected modules can occur. The mentioned processes of startup, setup, configuration and maintenance are referred to collectively as service processes below. Frequently, for carrying out the service processes, a dedicated service interface, for example, a USB (universal series bus) data interface is provided on the field bus coupler. Alternatively, the mentioned processes can also occur via a control computer connected to the field bus. In the context of the application, the computer from which a service process is carried out is referred to as service computer, regardless of whether this computer is connected via the field bus or via the separate service interface to the field bus coupler.

For carrying out the service processes, it is often helpful if a graphic image of the field bus coupler and optionally of the connected module is displayed. For example, in this way it is easier for the user to understand an allocation of connections to certain channels that can be addressed in a control program and their designation. Service programs running on the service computer for carrying out the service processes are for this purpose capable of overlaying an image of the fieldbus coupler and of the optionally connected modules on a screen of the service computer. To be able to establish this image, a collection (library) with a plurality of graphic files is stored on the control computer, files in which in each case one or more images of possible components of an input/output system are contained. The library here should comprise images of all the available components of one or more product families that can be used within the input/output system. In the case of expansion of the range of products offered and/or modification of the design of certain components, this library accordingly is no longer complete or no longer up to date, and, under some circumstances, it can reproduce only insufficiently the graphic image of the input/output system. As a result, there is a need to be able to adapt the library on the service computer continuously in the context of updating (updates) to the current product portfolio.

The present invention was developed to provide a method and an input/output system, in which an image of the input/output system is provided on a service computer, without the need for an expensive continual updating of a library on the service computer.

SUMMARY OF THE INVENTION

A primary object of the present invention is to provide a method and apparatus for producing an image of an input/output system for an industrial automation system, comprising storing in a field bus coupler at least one image data file containing image data, transmitting the image data from the image data file to a service computer connected with the field bus coupler, and generating and displaying in the service computer an image that is a function of the image data transmitted from the field bus coupler.

According to another object of the invention, additional image data may be stored in a module for transmittal to the service computer via a sub-bus and the field bus coupler, thereby to generate and display in the service computer a resultant image that is a function of both the image data and the additional image data.

According to the invention, the method for providing an image of an input/output system which has a field bus coupler for connection of modules to a fieldbus via a sub-bus comprises storing an image file containing image data in the fieldbus coupler. The image data from the image file is then transmitted to a service computer connected to the field bus coupler, which service computer, on the basis of the image data transmitted, generates the image and outputs it for representation, for example, on the screen of the service computer.

The image files with the image data, which reproduce the characteristic appearance of the field bus coupler, are thus independent of a central library stored on the service computer or at another central location. For example, the image files can already have been stored in the field bus coupler by the manufacturer. In this manner, it is ensured that the fitting image for each field bus coupler type used is available to the service computer.

In an advantageous design of the method, an additional image file containing additional image data is stored in a module that can be coupled to the fieldbus coupler. The additional image data from the additional image file is transmitted via the sub-bus to the fieldbus coupler and sent by the latter to the service computer. The resultant image is then generated on the basis of both the transmitted image data concerning the fieldbus coupler, and the additional image data concerning the module. The advantages mentioned before regarding the image of the field-bus coupler are thus also achieved for the images of the modules. The use of a central library of the images of the different possible components of the input/output system that is stored centrally on the service computer can be dispensed with. When expanding the product palette, there is accordingly no need for adding to such a library.

In one advantageous design of the method, the image data and optionally the additional image data, after the reception of a request sent by the service computer to the fieldbus coupler, are transmitted to the service computer. In this way, a data transfer can occur only when the image data are also needed.

In an advantageous design of the method, the additional image data are transmitted from the module to the fieldbus coupler only after the reception of the request. The data transfer from the module(s) to the fieldbus coupler thus occurs only when needed. However, it is possible to provide, alternatively, that the additional image data are transmitted already in an initialization phase of the input/output system from the module to the fieldbus coupler and placed in temporary storage there. In the process, the resulting advantage is a more rapid availability of the images of the modules, if the latter are requested by the service computer. In the case of more than one request by the service computer, there is, in addition, a resulting decrease in the data transfer on the sub-bus.

Preferably, the image file and/or the additional image file is/are stored in a read-only memory. The latter read-only memory can preferably be a read-only memory used for storing the so-called firmware or for storing settings of the fieldbus coupler or the modules, in particular a flash memory. Also, the image file can be part of the firmware so that it can be updated or retrofitted if needed with the firmware.

The method according to the application can be carried out in connection with a service computer which is connected to the fieldbus coupler via a service interface configured in particular according to the USB standard. Alternatively, the service computer can also be connected via the fieldbus to the fieldbus coupler The input/output system according to the invention for an industrial automation system comprises a field bus coupler for connection of modules to a fieldbus. It is characterized in that the field bus coupler has a read-only memory in which an image file with a diagrammatic image of a view of the fieldbus coupler is stored, wherein the fieldbus coupler is set up in order to send image data contained in the image file to a service computer connected to the field bus coupler.

In an advantageous design, the input/output system comprises at least one module which can be coupled to the fieldbus coupler and which comprises a read-only memory in which an additional image file with a diagrammatic image of a view of the module is stored. The module is set up in order to transmit additional image data contained in the additional image file to the fieldbus coupler, which the fieldbus coupler sends to the service computer.

Such an input/output system is suitable for carrying out the method according to the invention, wherein the above-described advantages are obtained.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
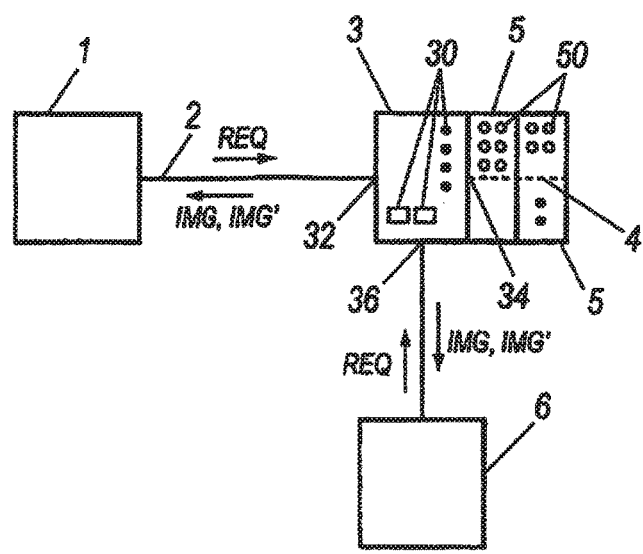
FIG. 1 is a generic block diagram of an industrial automation installation in accordance with the present invention.

Referring first more particularly to FIG. 1, the industrial automation system of the present invention comprises a control computer 1 which is connected via a field bus 2 to a field bus coupler 3 for data exchange with the latter. The field bus can here be configured according to a known standard such as PROFIBUS, PROFINET, EtherCAT or CANopen, for example.

The field bus coupler 3 transfers data exchanged via the field bus 2 to a preferably serial sub-bus 4 by means of which modules 5 are coupled to the field bus coupler 3. In addition to the sub-bus 4, which is used in this embodiment example only for data transmission, an additional bus (not shown here) for the power supply of the modules 5 and/or of the field bus coupler 3 can be provided. To feed supply current, additional power supply modules are then provided, which can be arranged at the end of the represented array of the modules 5, or between modules 5, or between the field bus coupler 3 and the modules 5. The represented modules 5 can be input/output modules or also other functional modules, for example, signal converters or interface modules. A power supply module that can communicate via the sub-bus 4 with the field bus coupler 3 also represents a module 5 in this sense.

In the depicted embodiment example, the field bus coupler 3 in addition comprises a service connection 36 by means of which it is connected to a service computer 6. The service connection 36 can be configured, for example, according to the USB standard. Via the service computer 6, service tasks can be carried out on site on the field bus coupler and the modules connected thereto. As already mentioned, in the context of this description, the term "service process" is understood to mean, among other meanings, configuration, setup, startup and/or maintenance of the field bus coupler 3 and/or of the modules 5. In addition, a programming of a control program for the control of the industrial installation which is connected to the fieldbus coupler 3 or the modules 5, and which is to be controlled, can also be considered a service process. If the service processes are carried out by the control computer 1, the latter also represents a service computer in the sense of this application.

The field bus coupler 3 as well as the connected modules 5 have a characteristic appearance marked significantly by the proportions of the connection area as well as of the elements 30 and 50, respectively, arranged thereon. The elements 30, 50 are connections or connection possibilities, setting elements or signal elements, for example.

When performing the service activities, it is helpful to have displayed before one's eyes an image of the current configuration of the fieldbus coupler 3 and the modules 5 connected thereto. According to the application, it is provided for this purpose that corresponding image files, in which in each case data relating to at least one image of the field bus coupler 3 or the respective module 5, is stored in the field bus coupler 3 or the respective module 5 and made available to the service computer.

Figure 2:
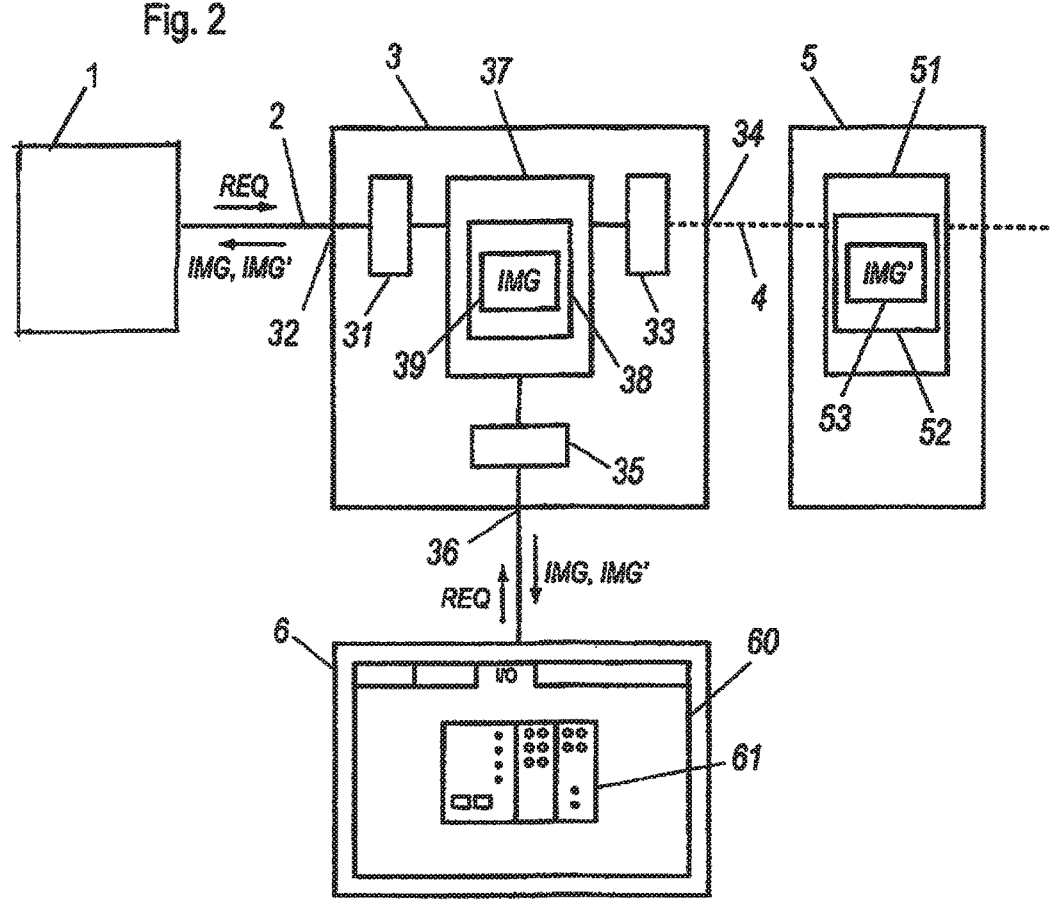
FIG. 2 is a more detailed block diagram of the present invention shown in FIG. 1.

In FIG. 2, the structure of a fieldbus coupler 3 set up for carrying out the method according to the application is represented in further detail, including a module 5 also designed according to the application, in a diagrammatic block diagram.

The field bus coupler 3 comprises, as central component, a control device 37 which comprises a sequence control (microcontroller), for example. The control device 37 is in connection via a field bus interface 31 with the field bus connection 32 and thus with the field bus 2, and, via a sub-bus interface 33, it is in connection with the sub-bus connection 34 and thus the sub-bus 4. The control device 37 is set up by a control program so that data received via the field bus 2 are transferred to the sub-bus 4 and vice versa, so that data received from the sub-bus 4 is transferred and sent via the field bus 2.

For the connection to the service connection 36 and thus to the service computer 6, a service bus interface 35 is provided in addition, which is also connected to the control device 37. With use of a USB connection between the fieldbus coupler 3 and the service computer 6, the service connection 36 is also referred to as USB interface, and the service bus interface 35 is referred to as USB controller.

The field bus coupler 3 comprises a read-only memory 38 in which an image data file 39 is stored, in which data relating to one or more images of the field bus coupler 3 is stored. The images show the connection area of the fieldbus coupler 3 with its connection-side elements 30 at least in a diagrammatic manner. The image data file 39 comprises image data IMG, for example, in a conventional graphics format such as TIFF, GIF, PNG or JPEG. As read-only memory 38, a flash memory can be used, for example, in which programs (firmware) and settings of the control device 37 are also stored.

The module 5 represented as an example in FIG. 2 also comprises a control device 51 which in turn comprises, in addition to a microcontroller that is not represented, a read-only memory 52 in which an additional image data file 53 of one or more images of the module 5 is stored. The additional image data file 53 contains additional image data IMG'. To simplify the representation, additional components of the module 5, for example, and bus interfaces or input/output components are not represented.

When performing a service process on a computer, here the service computer 6, for example, a service program 60 is carried out. The service program 60 offers the user the respective desired service functionality, that is to say, for example, the possibility of configuring, setting up, maintaining the field bus coupler 3 and/or the modules 5, or calling up status information. For assistance, the service program 60 represents an image 61 of the input/output system. In order to generate this image 61, the service program 60 sends off a corresponding request REQ to the field bus coupler 3, by means of which a transmission of the image data IMG from the image file 39 of the fieldbus coupler 3 or of the additional image data IMG' from the additional image file(s) 53 of the module(s) 5 is requested. In response to this request REQ, the field bus coupler 3 sends the image data IMG contained in the image file 39 to the service computer 6. Similarly, a request REQ may be made by the control computer 1 via the field bus 2.

Furthermore, additional image data IMG' is transmitted from connected modules 5 via the sub-bus 4 to the fieldbus coupler 3, and is also transmitted to the service computer 6. For the transmission of the additional image data IMG', it is possible that the field bus coupler 3, after receiving the request REQ, sends off via the sub-bus 4 a corresponding request to the module 5. In this case, the additional image data IMG' is transmitted to the fieldbus coupler 3 only if needed. Alternatively, it is possible that the field bus coupler 3 transmits the one corresponding request to the module 5 already in advance in an initialization phase of the input/output system via the sub-bus 4, and temporarily stores the additional image data IMG' sent back in response to the request.

Since the corresponding image data files 39, 53 are preferably stored already on the manufacturer's side in the read-only memories 38 and 52, this image for a new product type of a fieldbus coupler 3 or of a module 5 is available immediately upon use of these components in an automation system.

For fieldbus couplers or modules of an older type, which were not yet delivered with an image stored on the manufacturer's side, there exists, in the case of an appropriate design of the components, the possibility of retrofitting this image, together with a modification of the control program running in the respective control device, in the form of an updating of the so-called firmware of this fieldbus coupler or module.

In addition, the described method can be combined with the method known from the prior art, in which images of components potentially used within the input/output system are stored in a library on the service computer. If an image of the fieldbus coupler or the module is provided according to the application by the field bus coupler or by the module itself, this image is used. Otherwise, an image is looked for in the library and used in case of agreement of the type of the field bus coupler or of the module.

While in accordance with the provisions of the Patent Statutes the preferred forms and embodiments of the invention have been illustrated and described, it will be apparent to those skilled in the art that changes may be made without deviating from the invention described above.

The invention claimed is:

1. A method for providing an image of an input/output system for an industrial automation system including a field bus coupler connecting a control computer with a module and a service computer, comprising the steps of
    (a) storing at least one image file containing image data in a field bus coupler connected with a control computer via a field bus;
    (b) transmitting the image data from the image file to a service computer connected with the field bus coupler;
    (c) generating and displaying an image that is a function of the image data transmitted from the field bus coupler in the service computer;
    (d) storing an additional image data file containing additional image data in a module connected with the field bus coupler via a sub-bus;
    (e) transmitting the additional image data to the service computer via the sub-bus and the field bus coupler; and
    (f) generating and displaying a resultant image that is a function of the image data and the additional image data in the service computer.

2. A method as defined in claim 1, and further comprising an intermediate step of sending an image request from the control computer to the field bus coupler prior to the step of transmitting image data to the service computer.

3. A method as defined in claim 1, and further comprising an intermediate step of sending an image request from the service computer to the field bus coupler prior to the step of transmitting image data to the service computer.

4. A method as defined in claim 1, and further comprising an intermediate step of sending an image request from the service computer to the field bus coupler prior to the step of transmitting the additional image data to the service computer.

5. A method as defined in claim 1, and further comprising a preliminary step of transmitting the additional image data from the module to the field bus coupler for temporary storage therein during an initial initialization phase of the input/output system.

6. A method as defined in claim 1, wherein each of the image data and the additional image data is stored in a read-only memory.

7. A method as defined in claim 1, wherein the field bus coupler is connected with the service computer via a service interface that is configured in accordance with the UBS standard.

8. An input/output assembly for an industrial automation system, comprising
   (a) a control computer;
   (b) a field bus coupler a first input terminal connected with said control computer via a field bus, said field bus coupler including an output terminal and including a read-only memory in which is stored an image data file containing image data;
   (c) a service computer having an input terminal connected with said field bus coupler output terminal, said service computer generating and displaying an image that is a function of the image data received from said field bus coupler;
   (d) a module connected with a second input terminal of said field bus coupler via a sub-bus, said module including a read-only memory in which is stored an additional data file containing additional image data, said module being operable to transmit said additional image data to said service computer via said sub-bus, said field bus coupler and said output terminal, whereby said service computer generates and displays an image that is a function of both the image data and the additional image data.

9. An input/output assembly as defined in claim 8, and further comprising a service interface connecting said field bus coupler with said service computer, said service interface being configured in accordance with the UBS standard.

* * * * *